United States Patent
Eldawy (10) Patent No.: US 9,390,456 B2
(45) Date of Patent: Jul. 12, 2016

(54) SUMMARY VIEW OF A PROFILE

(71) Applicant: GOOGLE INC., Mountain View, CA (US)

(72) Inventor: Mohamed S. Eldawy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 352 days.

(21) Appl. No.: 13/727,390

(22) Filed: Dec. 26, 2012

(65) Prior Publication Data

US 2014/0181637 A1 Jun. 26, 2014

(51) Int. Cl.
*G06Q 50/00* (2012.01)
*G06F 17/30* (2006.01)

(52) U.S. Cl.
CPC ............ *G06Q 50/01* (2013.01); *G06F 17/3089* (2013.01)

(58) Field of Classification Search
CPC ..................................................... G06Q 50/01
See application file for complete search history.

(56) References Cited

U.S. PATENT DOCUMENTS

| | | | |
|---|---|---|---|
| 6,119,114 A * | 9/2000 | Smadja | |
| 2009/0210824 A1* | 8/2009 | Kawamura | 715/828 |
| 2011/0196927 A1* | 8/2011 | Vance | 709/204 |
| 2012/0144280 A1* | 6/2012 | Deng et al. | 715/202 |
| 2012/0166285 A1* | 6/2012 | Shapiro et al. | 705/14.58 |
| 2012/0166964 A1* | 6/2012 | Tseng | 715/745 |
| 2012/0323909 A1 | 12/2012 | Behforooz et al. | |
| 2012/0324004 A1 | 12/2012 | Le et al. | |
| 2012/0324550 A1 | 12/2012 | Wasilewski | |
| 2013/0054699 A1* | 2/2013 | Macaskill | 709/204 |
| 2013/0073970 A1* | 3/2013 | Piantino et al. | 715/738 |
| 2013/0086078 A1* | 4/2013 | Malleshaiah | G06Q 30/02 707/748 |
| 2013/0136304 A1* | 5/2013 | Anabuki et al. | 382/103 |
| 2013/0159132 A1* | 6/2013 | Adams | 705/26.7 |
| 2013/0325948 A1* | 12/2013 | Chen | G06Q 50/01 709/204 |
| 2014/0052718 A1* | 2/2014 | Waupotitsch et al. | 707/728 |
| 2014/0089816 A1* | 3/2014 | DiPersia et al. | 715/753 |
| 2014/0089953 A1* | 3/2014 | Chen et al. | 725/1 |
| 2014/0149843 A1* | 5/2014 | Sharma et al. | 715/234 |

FOREIGN PATENT DOCUMENTS

| | | |
|---|---|---|
| KR | 10-2012-0073324 A | 7/2012 |
| WO | WO-2007/002820 A2 | 1/2007 |

OTHER PUBLICATIONS

"Stackoverflow: Twitter seach (atom) API—exclude retweets", last updated Apr. 2, 2012, retrieved from http://stackoverflow.com/questions/7400656/twitter-search-atom-api-exclude-retweets.*

* cited by examiner

*Primary Examiner* — Stephen Hong
*Assistant Examiner* — Sanchita Roy
(74) *Attorney, Agent, or Firm* — McDermott Will & Emery LLP (57) ABSTRACT

Systems and methods for providing a summary view in a profile are provided. In some aspects, a first set of content items is received. The first set of content items is associated with a profile of a subject member. An interest score is determined for at least a portion of content items in the first set of content items. The interest score for a specific content item is not based on a time when the specific content item was posted. A subset of the first set of content items is determined. The subset includes content items having the interest score within an interest score range. Indicia of the subset are provided for display.

20 Claims, 6 Drawing Sheets

SUMMARY VIEW OF A PROFILE

BACKGROUND

The subject technology generally relates to social networking services and, in particular, relates to providing a summary view of a profile.

A user of a social networking service may access the social networking service to, among other things, reconnect with an old contact (e.g., a contact with whom the users have not spoken in a few years) or to learn about a new contact (e.g., a new contact whom the user recently met at a party or business event). However, a profile page of the contact in the social networking service may include a stream of recent posts by the contact, mentioning the contact, or shared with the contact. The posts in the profile page may be illustrative of recent activity of the contact (e.g., the contact recently visited a restaurant or recently watched a movie), but not of life events (e.g., relationship or family status changes or job status changes) of the contact, in which the user may be interested.

SUMMARY

In some innovative aspects, the disclosed subject matter relates to a computer-implemented method. The method includes receiving a first set of content items, the first set of content items being associated with a profile of a subject member. The method includes determining an interest score for at least a portion of content items in the first set of content items, where the interest score for a specific content item is independent of a time when the specific content item was posted. The method includes determining a subset of the first set of content items, where the subset includes content items having the interest score within an interest score range. The method includes providing indicia of the subset for display.

These and other embodiments can include one or more of the following features. The indicia of the subset are provided for display within a first page, and the first page lacks indicia of content items in the first set that are not in the subset. The indicia of the subset are provided for display in a summary of a profile page of the subject member, and the summary is provided for display based on a viewing user not having viewed the profile page of the subject member during a predetermined time period. The interest score for the specific content item is based on a number of times the specific content item is selected. The interest score for the specific content item is based on a number of comments associated with the specific content item. The method also includes determining, based on text or image data of the specific content item, that the specific content item corresponds to a life event or a unusual experience. The method also includes modifying the interest score for the specific content item based on the specific content item corresponding to the life event or the unusual experience. The first set of content items includes each content item associated with the profile of the subject member. The first set of content items includes a part of the content items associated with the profile of the subject member, and the first set of content items lacks content items that were re-shared by the subject member. The first set of content items includes a part of the content items associated with the profile of the subject member, and the first set of content items lacks geographic check-ins at first geographic locations, where one or more data repositories store at least a threshold number of geographic check-ins at the first geographic locations. The method also includes receiving, from the subject member, a request to modify the subset. The method also includes modifying the subset in response to the request. The number of content items in the subset is below or equal to a threshold number of content items. The threshold number of content items is determined based on a size of a device used to display the indicia of the subset. The method also includes determining that a user viewing the subset is interested in content items of a certain type. The method also includes modifying the interest score for the specific content item based on the specific content item having the certain type.

In some innovative aspects, the disclosed subject matter relates to a computer-readable medium encoded with executable instructions. The instructions include code for determining an interest score for at least a portion of content items in a first set of content items, where the first set of content items is associated with a profile of a subject member, and where the interest score for a specific content item is independent of a time when the specific content item was posted. The instructions include code for determining a subset of the first set of content items, where the subset includes content items having the interest score within an interest score range. The instructions include code for providing indicia of the subset for display.

These and other embodiments can include one or more of the following features. The indicia of the subset are provided for display within a first page, and the first page lacks indicia of content items in the first set that are not in the subset. The indicia of the subset are provided for display in a summary of a profile page of the subject member, and the summary is provided for display based on a viewing user not having viewed the profile page of the subject member during a predetermined time period. The interest score for the specific content item is based on a number of times the specific content item is selected. The interest score for the specific content item is based on a number of comments associated with the specific content item. The instructions also include code for determining, based on text or image data of the specific content item, that the specific content item corresponds to a life event or a unusual experience. The instructions also include code for modifying the interest score for the specific content item based on the specific content item corresponding to the life event or the unusual experience. The first set of content items includes each and every content items associated with the profile of the subject member. The first set of content items includes a part of the content items associated with the profile of the subject member, and the first set of content items lacks content items that were re-shared by the subject member. The first set of content items includes a part of the content items associated with the profile of the subject member, and the first set of content items lacks geographic check-ins at first geographic locations, where one or more data repositories store at least a threshold number of geographic check-ins at the first geographic locations. The instructions also include code for receiving, from the subject member, a request to modify the subset. The instructions also include code for modifying the subset in response to the request. The subset includes at most a threshold number of content items. The threshold number of content items is determined based on a size of a device used to display the indicia of the subset. The instructions also include code for determining that a user viewing the subset is interested in content items of a certain type. The instructions also include code for modifying the interest score for the specific content item based on the specific content item having the certain type.

In some innovative aspects, the disclosed subject matter relates to a system. The system includes one or more processors and a memory. The memory includes instructions executable by the one or more processors. The instructions include code for receiving a first set of content items, the first set of content items being associated with a profile of a subject member. The instructions include code for determining an interest score for at least a portion of content items in the first set of content items, where the interest score for a specific content item is independent of a time when the specific content item was posted, where the interest score for the specific content item is based on text or image data of the specific content item, and where the interest score corresponds to a likelihood that the specific content item corresponds to a life event or a unusual experience. The instructions include code for determining a subset of the first set of content items, where the subset includes content items having the interest score within an interest score range. The instructions include code for providing indicia of the subset for display.

Advantageously, the subject technology allows for a summary view of a profile of a member of a social networking service to be provided. The summary view can include information about life events of the member (e.g., marriage, birth of children, career changes, engagement in unusual activities, etc.) to allow a viewing user of the social networking service to quickly learn about important aspects of the member's life.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

As illustrated above, an approach for providing a summary view, for example of life events or unusual experiences, of a member of a social networking service may be desirable. In some aspects, the subject technology provides techniques for determining and displaying a summary view, for example of life events, of a member of a social networking service. According to some aspects, a server receives a first set of content items (e.g., posts, geographic check-ins, images, videos, etc.) in the social networking service. The first set of content items is associated with a profile of a subject member (e.g., a member about whom information is requested, or whose information is being accessed) of the social networking service. For example, the first set of content items can include posts, geographic check-ins, images, or videos on the profile page of the subject member. The server determines an interest score for at least a portion of content items in the first set of content items. The interest score for a specific content item may be independent of or may not be based on a time when the specific content item was posted to the social networking service. The interest score may represent a likelihood that the specific content item corresponds to a life event (e.g., a wedding) or an unusual experience (e.g., skydiving). The interest score for a specific content item may be based, for example, on a number of times the content item was viewed or selected, a number of comments associated with the content item, or key words (e.g., "wedding" or "marry") or key images in the content item. The server determines a subset of the first set of content items that have the interest score within an interest score range (e.g., at least a threshold interest score or at most a threshold interest score). The server provides indicia of the subset for display within a first page (e.g., a webpage or a page in an application executing on a mobile phone or tablet computer). The first page lacks indicia of content items in the first set that are not in the subset. For example, the first page can correspond to a summary of a profile page of the subject member. The summary can be provided for display based on a viewing user (who is viewing the profile of the subject member) not having viewed the profile page of the subject member during a predetermined time period (e.g., one year). A viewing user who has not viewed the profile page of the subject member during the predetermined time period may be interested in important life events of the subject member rather than his/her recent posts.

Some aspects of the subject technology include storing information about users of a social networking service. For example, information may be stored regarding a user's marital, family or relationship status, or regarding a user's career. This information is affirmatively provided to the social networking service by the user, and the user may remove this information from the social networking service at any time. Also, the social networking service may store information about content that a user likes to view, for example, if a viewing user is more interested in relationship and family information or career information. The user can opt-out of having the social networking service store this information or affirmatively provides permission for the social networking service to store this information. The user may withdraw his/her permission for the social networking service to store this information at any time. The social networking service may remind the user that his/her information is stored, for example, when the user logs in to or accesses the social networking service or via an electronic messaging (e.g., email) address of the user. The reminders may be provided once every threshold number of days (e.g., once every thirty days) or once every threshold number of log ins or accesses of the social networking service by the user (e.g., once every twenty accesses of the social networking service).

Figure 1:
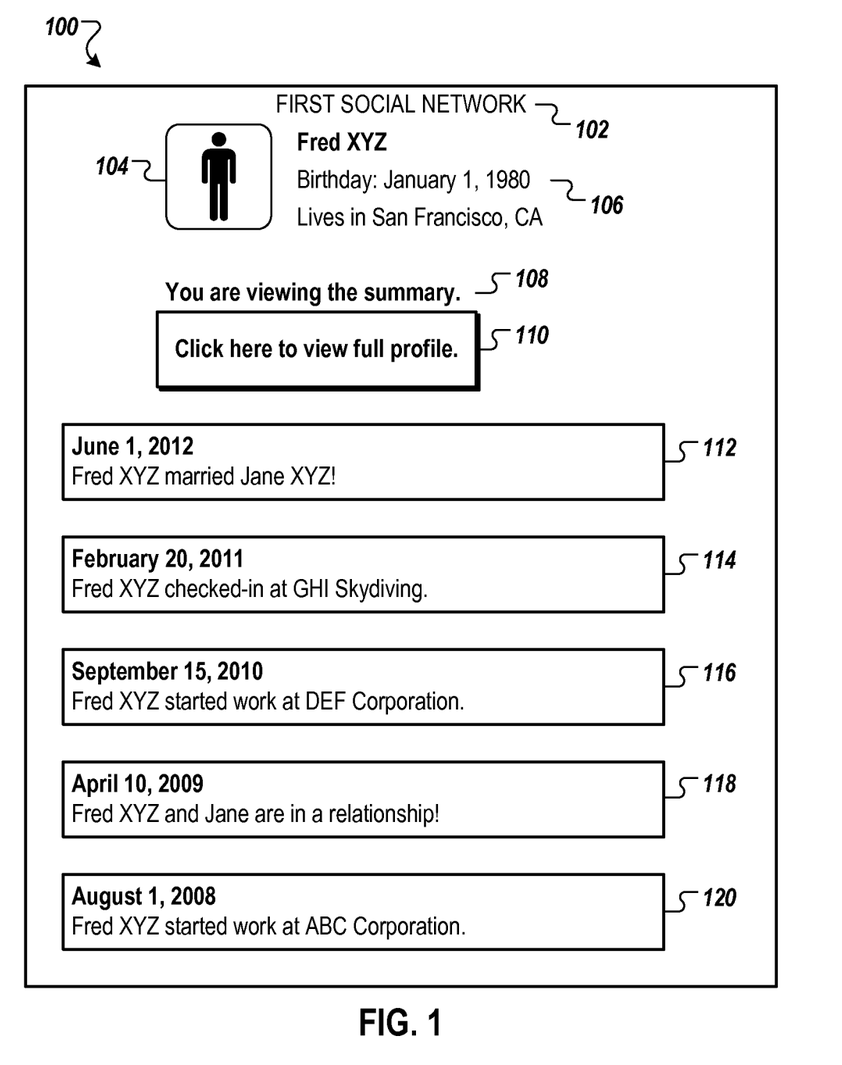
FIG. 1 illustrates an example summary view of a profile of a subject member of a social networking service.

FIG. 1 illustrates an example page 100 displaying a summary view of a profile of a subject member of a social networking service. The page 100 may be displayed via a web browser or via a special purpose application (e.g., a social networking service application executing on a mobile device or tablet computer).

As shown, the page 100 includes a title 102 of the social networking service ("First Social Network"), a profile picture 104 of the subject member, biographic information 106 of the subject member, an indication that the summary 108 is being viewed, and a link 110 to view a full profile (including recent posts) of the subject member.

The page 100 also includes posts 112, 114, 116, 118, and 120. The posts correspond to life events (e.g., wedding in 112) or unusual experiences (e.g., skydiving 114) of the subject member. The posts that correspond to life events or unusual experiences may be selected by determining an interest score for each posts of the user and selecting posts whose interest score falls within an interest score range. The interest score range can correspond to interest scores above a threshold value or interest scores below a threshold value. The interest score for a post may be calculated based on a number of comments associated with the post, a number of times the post was viewed, or key words (e.g., "wedding" or "marry") in the post.

Figure 2:
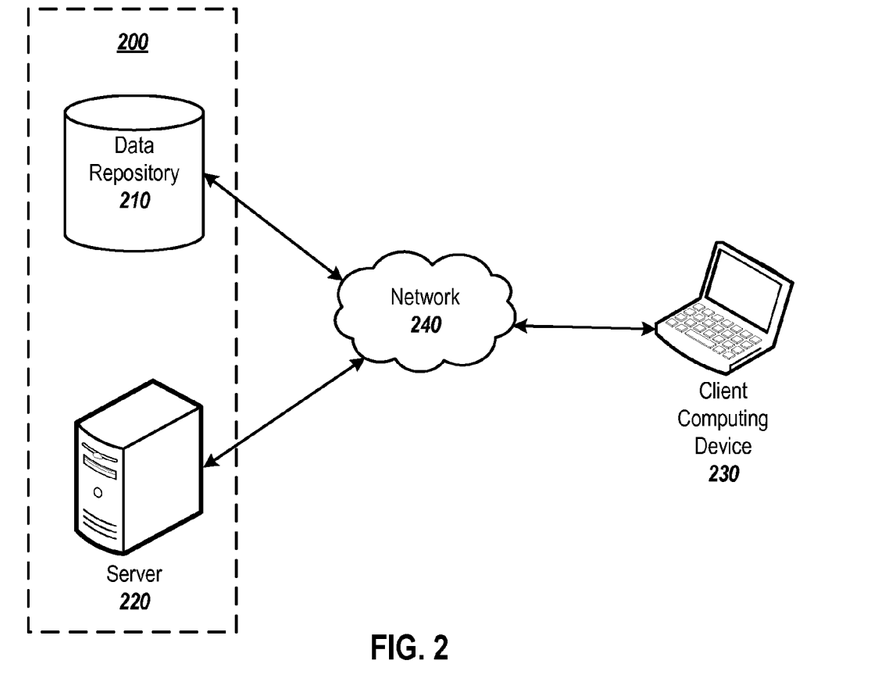
FIG. 2 illustrates an example of a system for providing a summary view of a profile.

FIG. 2 illustrates an example of a system 200 for providing a summary view of a profile, for example, in a social networking service. As shown, the system 200 includes a data repository 210 and a server 220. The data repository 210 and the server 220 communicate with one another and with a client computing device 230 via a network 240. The network 240 may include the Internet, an intranet, a local area network, a wide area network, a wired network, a wireless network, or a virtual private network (VPN). While only one data repository 210, server 220, and client computing device 230 are illustrated, the subject technology may be implemented in conjunction with any number of data repositories 210, servers 220, or client computing devices 230. In some aspects, a single machine may implement the functions of two or more of the data repository 210, the server 220, or the client computing device 230.

The data repository 210 stores social content (e.g., content item(s) posted by subject member(s)) associated with the social networking service. One example of the data repository 210 is described in more detail in conjunction with FIG. 3 below.

The server 220 includes one or more modules for facilitating user interaction with the social networking service via a browser or a special purpose application executing on the client computing device 230. The server 220 may be implemented as a single machine with a single processor, a multiprocessor machine, or a server farm including multiple machines with multiple processors. One example of the server 220 is described in more detail in conjunction with FIG. 4 below.

The client computing device 230 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 230 may include one or more of a keyboard, a mouse, a display, or a touch screen. The client computing device 230 may also include a web browser configured to display webpages, for example a webpage of the social networking service. Alternatively, the client computing device 230 may include a special-purpose application (e.g., a mobile phone or tablet computer application) for accessing the social networking service.

Figure 3:
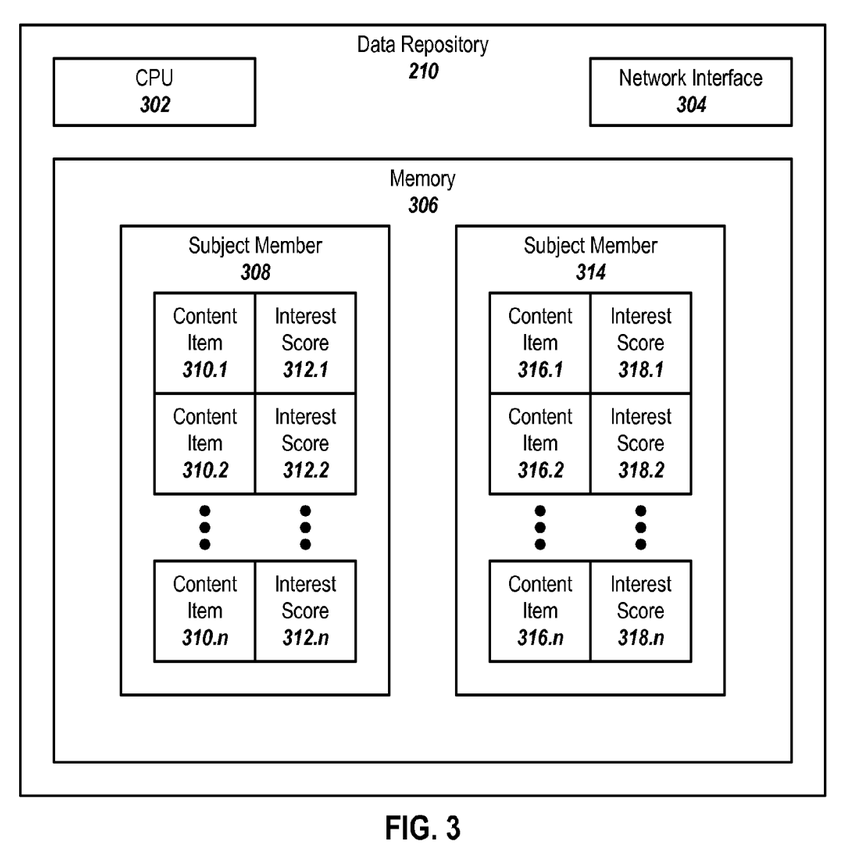
FIG. 3 illustrates an example of the data repository of FIG. 2.

FIG. 3 illustrates an example of the data repository 210 of FIG. 2. As shown, the data repository 210 includes a central processing unit (CPU) 302, a network interface 304, and a memory 306. The CPU 302 includes one or more processors. The CPU 302 is configured to execute computer instructions that are stored in a computer-readable medium, for example, the memory 306. The network interface 304 is configured to allow the data repository 210 to transmit and receive data in a network, e.g., network 240 of FIG. 2. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes information about subject members 308 and 314. While the subject technology is illustrated in FIG. 2 in conjunction with two subject members 308 and 314, the subject technology may be implemented with any number of subject members.

A subject member 308 or 314 may correspond to a user of the social networking service who has a profile in the social networking service. The user may be, for example, an individual, an organization (e.g., an organization of homeless shelter volunteers), a business (e.g., a restaurant), or a group (e.g., a chess club).

As shown, the subject member 308 has an associated set of content items 310.1-$n$. The content items 310.1-$n$ include one or more of text posts, images, videos, geographic check-ins, re-shared content items, or other content. Each content item 310.$k$ has a corresponding interest score 312.$k$. The interest score 312.$k$ corresponds to a likelihood that the corresponding content item 310.$k$ corresponds to a life event (e.g., a family status change, a relationship status change, or a career change) or an unusual experience. As used herein, the phrase "unusual experience" encompasses its plain and ordinary meaning including, but not limited to, an experience in which relatively few people, e.g., less than 5% of a population, engage, e.g., sky diving or bungee jumping in the United States, or an experience in which individuals typically engage rarely, e.g., foreign travel. The interest score 312.$k$ may be determined based on text or image data of the corresponding content item 310.$k$, based on a number of users who viewed or selected the corresponding content item 310.$k$, or based on a number of comments on the corresponding content item 310.$k$. Content items corresponding to life events or unusual experiences are likely to have a larger number of selections or comments than other content items. In certain aspects, the interest score 312.$k$ is not determined based on a time when the corresponding content item 310.$k$ was posted, as a recent (e.g., taking place within the last week) content item 310.$k$ is not more likely to correspond to a life event or unusual experience than an older (e.g., taking place at least three years ago) content item 310.$k$.

The subject member 314 also has an associated set of content items 316.1-$n$ with corresponding interest scores 318.1-$n$. Each subject member (e.g., subject member 308 or 314) can have any number of content items.

Figure 4:
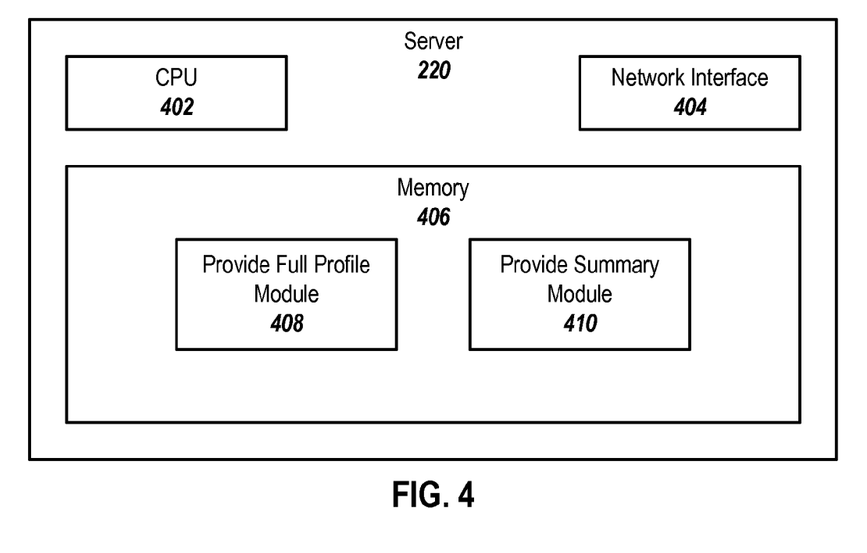
FIG. 4 illustrates an example of the server of FIG. 2.

FIG. 4 illustrates an example of the server 220 of FIG. 2. As shown, the server 220 includes a central processing unit (CPU) 402, a network interface 404, and a memory 406. The CPU 402 includes one or more processors. The CPU 402 is configured to execute computer instructions that are stored in a computer-readable medium, for example, the memory 406. The network interface 404 is configured to allow the server to transmit and receive data in a network, e.g., network 240 of FIG. 2. The network interface 404 may include one or more network interface cards (NICs). The memory 406 stores data or instructions. The memory 406 may be one or more of a cache unit, a storage unit, an internal memory unit, or an external memory unit. As illustrated, the memory 306 includes a provide full profile module 408 and a provide summary module 410.

The provide full profile module 408, when executed, is configured to provide a full profile view of a subject member (e.g., subject member 308). The full profile view includes all or a subset of the content items (e.g., content items 310.1-n) of the subject member. The content items can be arranged according to an order, for example, a chronological order. In some aspects, the full profile view can include only a threshold number (e.g., twenty) of the most recent content items of the subject member.

The provide summary module 410, when executed, is configured to determine interest scores (e.g., interest scores 312.1-n) for the content items (e.g., content items 310.1-n) of a subject member (e.g., subject member 308). The provide summary module 410 is configured to determine a subset of the content items of the subject member, where the subset includes content items having an interest score within an interest score range (e.g., an interest score exceeding a threshold value or an interest score below a threshold value). The provide summary module 410 is configured to provide indicia of the content items in the subset for display, for example, via a client computing device (e.g., client computing device 230) on a summary view (e.g., page 100) of the profile of the subject member.

Figure 5:
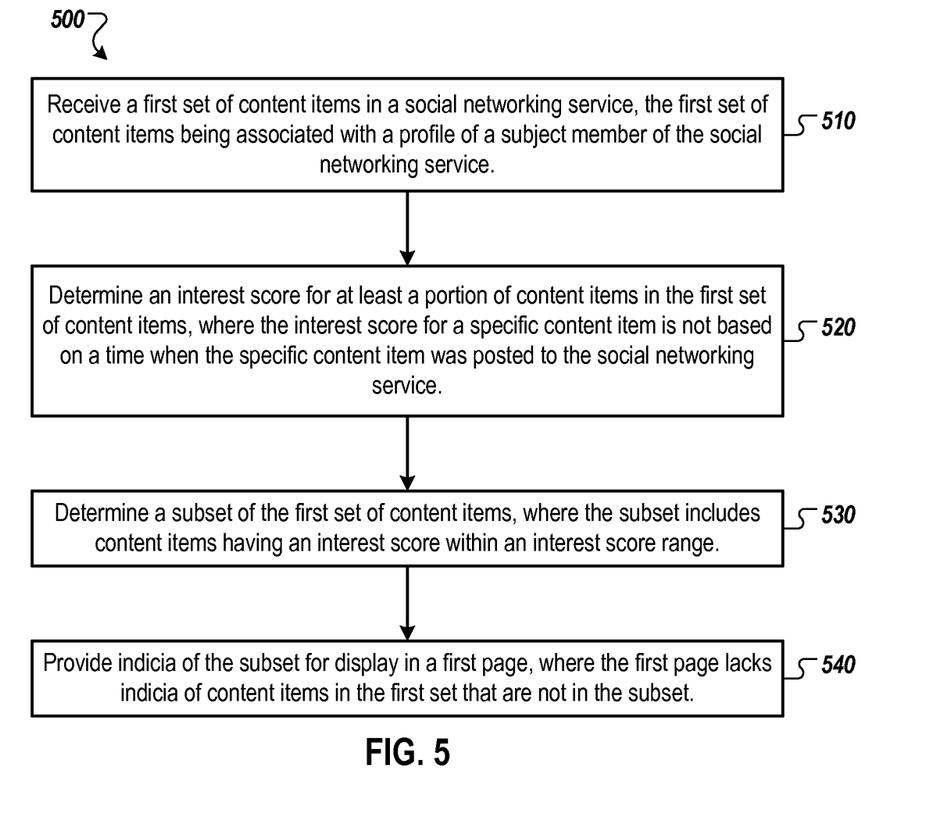
FIG. 5 illustrates an example process by which a summary view of a profile may be provided.

FIG. 5 illustrates an example process 500 by which a summary view (e.g., page 100) of a profile may be provided.

The process 500 begins at step 510, where a server (e.g., server 220) receives a first set of content items (e.g., posts, geographic check-ins, images, videos, etc.) in a social networking service. The first set of content items is associated with a profile of a subject member (e.g., a member 308 or 314 about whom information is to be provided) of the social networking service. For example, the first set of content items can include all or a part of the content items in the profile of the subject member (e.g., content items 310.1-n for subject member 308). In some aspects, the first set of content items lacks content items that were re-shared by the subject member. In some aspects, the first set of content items lacks geographic check-ins at geographic locations where at least a threshold number (e.g., one hundred) of other members of the social networking service have checked-in. For example, if multiple members of the social networking service check in at ABC Coffee House, geographic check-ins by the subject member at ABC Coffee House can be excluded from the first set of content items. The geographic check-ins by the other members may be stored in one or more data repositories (e.g., as content item(s) among content items 310.1-n or 316.1-n in the data repository 210). Alternatively, the content items that were re-shared or the geographic check-ins can be filtered out of the first set.

In step 520, the server determines an interest score for at least a portion of the content items in the first set of content items. The interest score for a specific content item is not based on a time when the specific content item was posted to the social networking service. The interest score may be based on a number of times the specific content item was selected or a number of comments associated with the specific content item.

In some aspects, the server determines, based on text or image data of the specific content item (e.g., the specific content item including key words or key images), that the specific content item corresponds to a life event (e.g., a job change) or a unusual experience (e.g., a trip outside one's home country). The server modifies (e.g., increases or decreases) the interest score for the specific content item based on the specific content item corresponding to the life event or the unusual experience.

In some aspects, the server may determine that the viewing user, who is viewing information about the subject user, is interested in content items of a certain type (e.g., family/relationship status changes or job changes) based on the viewing user's past interactions with the social networking service (e.g., content typically viewed by the user). The server may modify (e.g., increase or decrease) the interest score for a specific content item based on the content item having the certain type.

In some aspects, the server determines the interest score by weighing any of the factors set forth above. The relative weights of the factors set forth above may be determined by artificial intelligence. The artificial intelligence may be used in conjunction with indications, by human operators, regarding which content items correspond to life events or unusual experiences in public profiles of the social networking service. For example, a human operator may look through a set of profiles and indicate which events correspond to life events or unusual experiences. These indications may be stored in the server or in a data repository and provided to the artificial intelligence (e.g., a neural network) to develop a set of rules for determining which content items correspond to life events or unusual experiences based on the factors set forth above.

In step 530, the server determines a subset of the first set of content items. The subset includes content items having the interest score within an interest score range. The interest score range can correspond to interest scores below a threshold or interest scores exceeding a threshold (i.e., the content items that are most likely to correspond to life events or unusual experiences).

In step 540, the server provides, to a client computing device of a viewing user attempting to view a summary of the profile of the subject member, indicia of the subset for display in a first page (e.g., a webpage or a page in an application executing on a mobile device or tablet computer). The indicia of the subset may include text from content items in the subset or thumbnails of images or videos in the subset. The first page (e.g., page 100 of FIG. 1) lacks indicia of content items in the first set that are not in the subset. The first page can be a summary page of the profile of the subject member. The summary page can be provided for display based on the viewing user not having viewed the profile page of the subject member during a predetermined time period (e.g., one year). As a viewing user who has not viewed the profile page of the subject member during the predetermined time period may be interested in important life events of the subject member rather than his/her recent posts.

The subject member is able to modify his/her summary page, for example, by adding or removing content item(s) from the summary page. The server may receive, from the subject member, a request to modify the subset of content items in the summary page and modify the subset in response to the request. For example, a geographic check-in at ABC Coffee House may not be placed in the summary, as the server may determine that such a geographic check-in is not a life event or an unusual experience. However, the geographic check-in may be a life event for the subject member, for example, if the subject member met his/her spouse at ABC Coffee House at the time of the geographic check-in.

The summary page may include at most a threshold number of content items. The threshold number of content items may be determined based on a size of a device used to display the summary page. For example, if the summary page is to be displayed via a mobile phone with a small screen, the threshold number of content items may be three. If the summary page is to be displayed on a laptop computer with a large screen, the threshold number of content items may be ten. After step 540, the process 500 ends.

Figure 6:
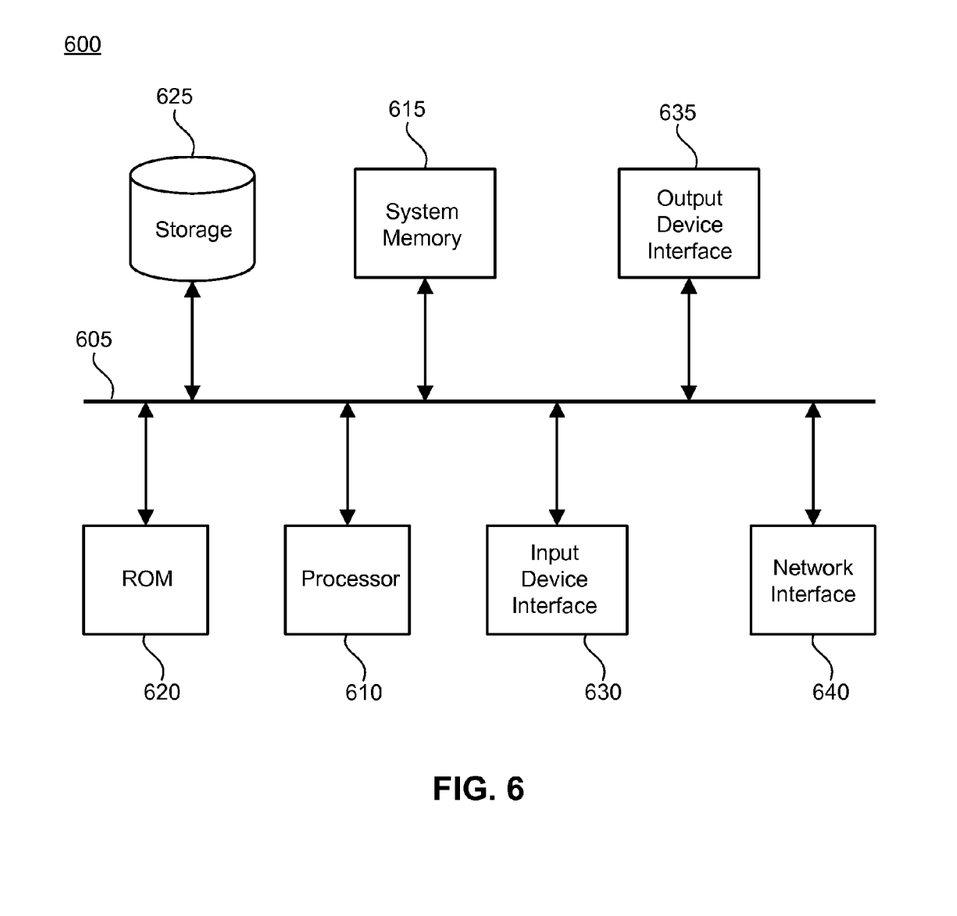
FIG. 6 conceptually illustrates an example electronic system with which some implementations of the subject technology are implemented.

FIG. 6 conceptually illustrates an electronic system 600 with which some implementations of the subject technology are implemented. For example, one or more of the data repository 210, the server 220, or the client computing device 230 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing a summary view of a profile in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
    receiving a first set of content items, the first set of content items being associated with a profile of a subject member;
    identifying a viewing user to whom the profile is to be displayed, the viewing user being different than the subject member;

determining, based on the viewing user's past interactions with a social network, that the viewing user is interested in content items of a predetermined type;

determining an interest score for at least a portion of content items in the first set of content items, wherein the interest score for a specific content item is based on whether the specific content item is of the predetermined type;

determining a subset of the first set of content items, wherein the subset comprises one or more content items that are associated with an interest score within a predetermined interest score range and that are consistent with the viewing user's interest in content items of the predetermined type and that are associated with an experience in which less than a predetermined threshold population of users of the social network have engaged; and providing indicia of the subset for display.

2. The method of claim 1, wherein the indicia of the subset are provided for display within a first page, and wherein the first page lacks indicia of content items in the first set that are not in the subset.

3. The method of claim 1, wherein the indicia of the subset are provided for display in a summary of a profile page of the subject member, and wherein the summary is provided for display when the viewing user has not viewed the profile page of the subject member during a predetermined time period.

4. The method of claim 1, wherein the interest score for the specific content item is based on a number of times the specific content item is selected.

5. The method of claim 1, wherein the interest score for the specific content item is based on a number of comments associated with the specific content item.

6. The method of claim 1, further comprising:
determining, based on text or image data of the specific content item, that the specific content item corresponds to a trip outside the subject member's home country, wherein the experience is associated with a physical sport or travel; and
modifying the interest score for the specific content item based on the specific content item corresponding to the trip.

7. The method of claim 1, wherein the first set of content items comprises each content item associated with the profile of the subject member.

8. The method of claim 1, wherein the first set of content items comprises a part of the content items associated with the profile of the subject member, and wherein the first set of content items lacks content items that were re-shared by the subject member.

9. The method of claim 1, wherein the first set of content items comprises a portion of content items provided for the profile of the subject member, wherein the first set of content items excludes geographic check-ins at first geographic locations, and wherein at least a threshold number of geographic check-ins at the first geographic locations are stored in one or more data repositories.

10. The method of claim 1, further comprising:
receiving, from the subject member, a request to modify the subset; and
modifying the subset in response to the request.

11. The method of claim 1, wherein the number of content items in the subset is below or equal to a threshold number of content items.

12. The method of claim 11, wherein the threshold number of content items is determined based on a size of a device used to display the indicia of the subset.

13. The method of claim 1, wherein the predetermined type comprises being associated with a status change event.

14. A computer-readable medium comprising instructions which, when executed by one or more computers, cause the one or more computers to perform a method, the method comprising:
identifying a viewing user to whom the profile is to be displayed, the viewing user being different than the subject member;
determining, based on the viewing user's past interactions with a social network, that the viewing user is interested in content items of a predetermined type;
determining an interest score for at least a portion of content items in a first set of content items, wherein the first set of content items is associated with a profile of a subject member, and wherein the interest score for a specific content item is based on whether the specific content item is of the predetermined type;
determining a subset of the first set of content items, wherein the subset comprises one or more content items that are associated with an interest score within a predetermined interest score range and that are consistent with the viewing user's interest in content items of the predetermined type and that are associated with an experience in which less than a predetermined threshold population of users of the social network have engaged; and
providing indicia of the subset for display.

15. The computer-readable medium of claim 14, wherein the indicia of the subset are provided for display within a first page, and wherein the first page lacks indicia of content items in the first set that are not in the subset.

16. The computer-readable medium of claim 14, wherein the indicia of the subset are provided for display in a summary of a profile page of the subject member, and wherein the summary is provided for display when the viewing user has not viewed the profile page of the subject member during a predetermined time period.

17. The computer-readable medium of claim 14, wherein the interest score for the specific content item is based on a number of times the specific content item is selected.

18. The computer-readable medium of claim 14, wherein the interest score for the specific content item is based on a number of comments associated with the specific content item.

19. The computer-readable medium of claim 14, the method further comprising:
determining, based on text or image data of the specific content item, that the specific content item corresponds to a trip outside the subject member's home country, wherein the experience is associated with a physical sport or travel; and
modifying the interest score for the specific content item based on the specific content item corresponding to the trip.

20. A system comprising:
one or more processors; and
a memory comprising instructions which, when executed by the one or more processors, cause the one or more processors to perform a method, the method comprising:
receiving a first set of content items, the first set of content items being associated with a profile of a subject member;
identifying a viewing user to whom the profile is to be displayed, the viewing user being different than the subject member;

determining, based on the viewing user's past interactions with a social network, that the viewing user is interested in content items of a predetermined type;

determining an interest score for at least a portion of content items in the first set of content items, wherein the interest score for a specific content item is based on whether the specific content item is of the predetermined type;

determining a subset of the first set of content items, wherein the subset comprises one or more content items that are associated with an interest score within a predetermined interest score range and that are consistent with the viewing user's interest in content items of the predetermined type and that are associated with an experience in which less than a predetermined threshold population of users of the social network have engaged; and providing indicia of the subset for display.

* * * * *